(12) United States Patent
Griffin et al.

(10) Patent No.: US 9,558,485 B2
(45) Date of Patent: Jan. 31, 2017

(54) TWO STEP NEAR FIELD COMMUNICATION TRANSACTIONS

(75) Inventors: Kent Griffin, Mountain View, CA (US); Carl B. Stone, Campbell, CA (US)

(73) Assignee: PAYPAL, INC., San Jose, CA (US)

(*) Notice: Subject to any disclaimer, the term of this patent is extended or adjusted under 35 U.S.C. 154(b) by 1500 days.

(21) Appl. No.: 12/242,627

(22) Filed: Sep. 30, 2008

(65) Prior Publication Data

US 2009/0192937 A1 Jul. 30, 2009

Related U.S. Application Data

(60) Provisional application No. 61/024,758, filed on Jan. 30, 2008, provisional application No. 61/034,890, filed on Mar. 7, 2008.

(51) Int. Cl.
| | |
|---|---|
| *G06Q 20/32* | (2012.01) |
| *G07F 17/32* | (2006.01) |
| *G06Q 40/00* | (2012.01) |
| *G06Q 20/10* | (2012.01) |
| *G06Q 20/38* | (2012.01) |
| *G06Q 20/40* | (2012.01) |
| *G06Q 30/06* | (2012.01) |
| *H04B 5/00* | (2006.01) |
| *H04L 29/08* | (2006.01) |
| *H04L 29/06* | (2006.01) |
| *H04W 12/06* | (2009.01) |
| *G06Q 20/42* | (2012.01) |

(52) U.S. Cl.
CPC ........ *G06Q 20/3278* (2013.01); *G06Q 20/10* (2013.01); *G06Q 20/102* (2013.01); *G06Q 20/105* (2013.01); *G06Q 20/108* (2013.01); *G06Q 20/322* (2013.01); *G06Q 20/3821* (2013.01); *G06Q 20/3829* (2013.01); *G06Q 20/40* (2013.01); *G06Q 20/4012* (2013.01); *G06Q 20/425* (2013.01); *G06Q 30/06* (2013.01); *G06Q 30/0601* (2013.01); *G06Q 40/00* (2013.01); *G07F 17/32* (2013.01); *H04B 5/00* (2013.01); *H04L 63/06* (2013.01); *H04L 67/04* (2013.01); *H04W 12/06* (2013.01)

(58) Field of Classification Search
USPC ............ 455/412.1, 406, 412; 235/380, 379; 705/39, 41–42, 76; 463/39
IPC ..................... G07F 17/32; G06Q 20/40,40/00
See application file for complete search history.

(56) References Cited

U.S. PATENT DOCUMENTS

| | | |
|---|---|---|
| 6,175,922 B1 | 1/2001 | Wang |
| 6,282,656 B1 | 8/2001 | Wang |
| 6,594,759 B1 | 7/2003 | Wang |

(Continued)

*Primary Examiner* — Harish T Dass
(74) *Attorney, Agent, or Firm* — Haynes and Boone, LLP

(57) ABSTRACT

A two step method for transferring money from a sender to a recipient includes entering information relating to the transfer into a near field communication (NFC) enabled device of the sender. The device is then placed in contact with or close proximity to a recipient's device a first time, causing the sender's device to establish an NFC link between the two devices and to gather information relating to the recipient via the NFC link. The sender's device is then placed in contact with or close proximity to the recipient's device a second time, causing it to transmit the information relating to the transfer and the recipient to a third party service provider via another network, e.g., the Internet, thereby causing the service provider to transfer the money from an account of the sender to an account of the recipient.

22 Claims, 8 Drawing Sheets

(56) References Cited

U.S. PATENT DOCUMENTS

| | | |
|---|---|---|
| 6,850,916 B1 | 2/2005 | Wang |
| 7,107,246 B2 | 9/2006 | Wang |
| 7,330,714 B2* | 2/2008 | Rosenberg ................. 455/412.1 |
| 7,635,084 B2 | 12/2009 | Wang et al. |
| 2002/0023215 A1 | 2/2002 | Wang et al. |
| 2008/0079573 A1* | 4/2008 | Bloebaum et al. ........ 340/568.1 |
| 2008/0177668 A1* | 7/2008 | Delean ........................... 705/76 |

* cited by examiner

Typical Request Money

1. Recipient sends request to PayPal (amount, sender id)
2. PayPal sends request to sender (amount, recipient id)
3. Sender authorizes payment.
4. PayPay notifies the recipient Request Money over NFC 1. Recipient sends request to sender over NFC (amount, recipient id)
2. Sender authorizes payment.
3. PayPay notifies the recipient

TWO STEP NEAR FIELD COMMUNICATION TRANSACTIONS

RELATED APPLICATIONS

This application claims benefit of U.S. Provisional Application Nos. 61/024,758, filed Jan. 30, 2008, and 61/034,890, filed Mar. 7, 2008, the entire respective disclosures of which are incorporated herein by reference.

BACKGROUND

1. Field of the Invention

The present disclosure relates generally to financial transactions and more particularly to peer-to-peer payment between mobile devices using near field communication (NFC) in a network environment.

2. Related Art

Arguably, mobile phones are currently the most widespread mobile computing device in the world. They have become ubiquitous companions in our life, enabling communication nearly anytime and anywhere to facilitate information access to mobile services and the Internet. In addition, mobile phones have become multimedia computing platforms with integral digital cameras for taking pictures and video, playing music, recording conversations, and for organizing our lives.

Using physical objects as entry points to data and services can ease mobile communication and information access. Augmentation of the environment enables physical mobile interactions, which involve a user, a mobile device, and a physical object or another mobile device. The object is augmented with some kind of technology and subsequently stores information. The information is typically associated with a mobile service that might be triggered through an interaction with the physical object. Physical mobile interactions make it possible to bridge the gap between the physical and virtual world. In order to support communication between the mobile device and the augmented object, communication technologies are required.

Different short-range communication technologies have been integrated into mobile devices in recent years. The process began with infrared transceivers for synchronizing applications with a desktop computer. Bluetooth technology evolved and overcame some of the problems experienced with infrared. However, when attempting to connect two devices with Bluetooth, the setup is often lengthy and is very often not user-friendly.

Radio Frequency Identification (RFID) is another technology that has been easily integrated into mobile devices, such as cellular telephones, personal digital assistants (PDAs), or computers. RFID works with active communication devices (transceivers or read-write devices) and passive non-powered tags (transponders). The tags are relatively small, inexpensive, and can store information, making them suitable for augmenting physical objects unobtrusively. The transponder is attached to objects that are to be identified and contains information, such as product price or vehicle identification, for example. The transceiver emits an electromagnetic signal that activates the tag and enables the transceiver to read the tag's information and/or to alter it, assuming the tag is re-writeable. Usually, the transceiver is in communication with a computer or similar device to which the information is passed.

Near Field Communication, herein referred to as "NFC," is the most recently explored technology for object augmentation to bring mobile devices and physical objects together to enable a user to interact with the augmented objects for information and/or data communication.

In this regard, NFC is a short range, high frequency, wireless communication technology that enables the exchange of data between devices over a relatively short distance, viz., 0-20 cm. NFC is based on RFID technology and uses many of the same working principles. The technology is standardized in ISO/IEC 18092 (International Organization for Standardization/International Electrotechnical Commission), ECMA-340 (European association for standardizing information and communication systems), and ETSI 102.190 (European Telecommunications Standards Institute). All of these standards define the NFC Interface and Protocol-1 (NFCIP-1), see FIG. 1, which specify the modulation schemes, coding, transfer speeds and frame format of the RF interface of NFC devices, as well as initialization schemes and conditions required for data collision-control during initialization for both passive and active NFC modes.

NFC is also standardized in ISO/IEC 21481 and ECMA 352, which corresponds to NFC Interface and Protocol-2 (NFCIP-2). The NFCIP-2 standard specifies the mechanism to detect and select one communication mode out of three possible communication modes typical of NFC devices (Peer-to-Peer, Read/Write Card, and Card Emulation), as further shown in FIG. 1.

NFC is compatible with ISO/IEC 14443 type A and type B (proximity cards operating at a maximum distance of 20 cm), ISO/IEC 15693 (vicinity cards operating at a distance from 10 cm to 2 m) and to the FeliCa contactless smart card system. Accordingly, an NFC device can communicate with both existing ISO 14443 smartcards and readers, as well as with other NFC devices, and is compatible with existing contactless infrastructure already in use for, among other things, public transportation, payment, and promotion/advertising.

As discussed above and illustrated in FIG. 1, a key feature of NFC devices is that the NFC chip that is integrated into the NFC device can read out an RFID tag's information, emulate a smart card so that a reader can access its data, or communicate directly with another NFC device in a peer-to-peer fashion when the two NFC enabled devices are brought into direct contact or in very close proximity to each other. In other words, NFC technology enables communication between devices that both have active power and computing capabilities, as well as communication between powered devices and passive tags.

For operating in Reader Mode, it is sufficient to hold the NFC device near a compatible tag that stores some information (typically 1 Kb-4 kb). This information could be, for example, a bookmark of a company website in the company advertising poster, a timetable of a bus near a bus stop, some tourist information beside works of art near a museum, or the like. With peer-to-peer communication mode, it is possible, for example, to synchronize calendars between two NFC PDAs, or to set up networks (Bluetooth, Wi-Fi, or the like) simply by holding the two NFC devices in close proximity to each other. In card emulation mode, the NFC device can host virtual payment cards and enable the user to make payments. For example, it is possible to buy a travel ticket while providing management of associated customer loyalty and bonus programs. In card emulation mode, it is also possible to control access, i.e., the NFC device acts as a key.

Prior to utilizing many known NFC devices for the first time, some sort of pre-operationally process is typically required. In this regard, the present disclosure describes an activation and authorization process that may provide security features, as well as check NFC device compatibility and pre-configure the device accordingly.

One example of an NFC technology application is financial transactions. A consumer taps the NFC device on a reader to effect a monetary transfer. Typically, a retailer enters the total amount due, and the consumer taps the NFC device on the reader, which causes payment de-tails to be sent to the consumer's financial institution. Very shortly after, the consumer and retailer receive payment confirmation. Such a method provides advantages such as eliminating the need to carry cash and enabling a faster financial transaction. PayPass is an example of this type of method. However, this method is limited in that the transfer is with a retailer at a POS terminal or reader. Further, the consumer NFC device simply authorizes a money transfer based on the POS terminal.

SUMMARY

For purposes of summarizing the disclosure, exemplary embodiments of peer-to-peer payments between mobile devices using near field communication in a network environment are described herein.

In one embodiment, a two step, or "two-tap" method for transferring money from a sender to a recipient comprises entering information relating to the transfer into a near field communication (NFC) enabled data communication device of the sender. The sender's device is then placed in close proximity to a NFC enabled data communication device of the recipient a first time (a "first tap"), which causes the recipient's device to establish an NFC link between the two devices and to gather information relating to the recipient from the recipient's device via the NFC link. The sender's device is then placed in close proximity to the recipient's device a second time (a "second tap"), causing the sender's device to transmit the information relating to the transfer and the recipient to a third party service provider via a network thereby causing the service provider to transfer the money from a funding account of the sender to a receiving account of the recipient.

A better understanding of the above and many other features and advantages of the novel payment systems and methods of the present invention may be obtained from a consideration of the detailed description of some example embodiments thereof below, particularly if such consideration is made in conjunction with the several views of the appended drawings, wherein like elements are referred to by like reference numerals throughout.

DETAILED DESCRIPTION

Figure 1:
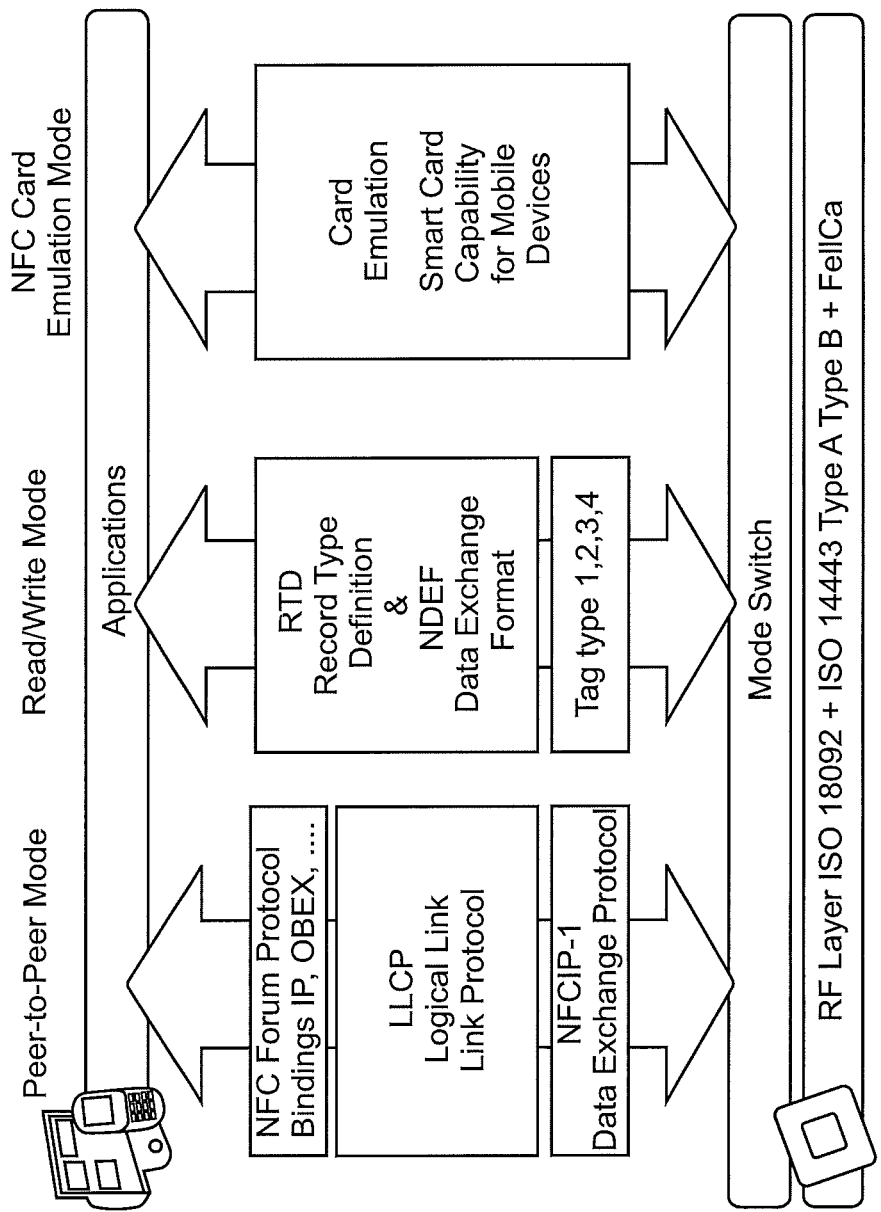
FIG. 1 shows that an NFC enabled device can read out an RFID tag's information, emulate a smart card so that a reader can access its data, or communicate directly with another NFC device in peer-to-peer fashion when the two NFC devices are brought in direct contact or in very close proximity to each other.

Exemplary embodiments will now be described with references to the accompanying figures, wherein like reference numbers are used to refer to like elements throughout. The terminology used in the description presented herein is not intended to be interpreted in any limiting or restrictive manner simply because it is being utilized in conjunction with a detailed description of certain embodiments. Furthermore, various embodiments (whether or not specifically described herein) may include novel features, no single one of which is solely responsible for their novelty or desirability.

As indicated above, NFC is a short-range wireless connectivity technology that evolved from a combination of existing contactless identification and interconnection technologies. Operating at 13.56 MHz via magnetic field induction (i.e., two loop antennas are located within each other's near field) and transferring data at up to 424 Kbits/second, NFC provides simple communication between electronic devices over relatively short distances, viz., 0-20 cm. This means that no restrictions are applied and no licenses are required for use of the NFC devices in the RF band. NFC is both a "read" and "write" technology. Furthermore, combining the read and write modes in more than two mobile devices enables a third peer-to-peer mode by alternating between read and write modes. As also discussed above, the underlying layers of NFC technology follow universally implemented ISO, ECMA, and ETSI standards. Because the transmission range of NFC is very short, NFC-enabled transactions are relatively secure. However, to provide more robust security, applications may use higher layer cryptographic protocols, such as TLS, SSL, or the like.

In this regard, the NFC interface and protocols primarily target consumer electronics users that will be able to use the secure means of communication between various devices without exerting much effort in configuring their "network". Communication between two NFC-compatible devices occurs when they are brought in close proximity with a wave or touch of the two device(s). This action causes the respective NFC wireless interfaces of the two devices to engage and configure the devices to link up in a peer-to-peer network, enabling the automated and transparent establishment of a network connection between the devices.

The NFC communication protocol distinguishes between an Initiator device and a Target device of the NFC network communication. Any device may be either an Initiator or a Target. The Initiator, as indicated by the name, is the device that initiates and controls the exchange of data. The Target is the device that answers a request for data from the Initiator. A device may also be both initiator and target, as described in the peer-to-peer mode above.

The NFC protocol further distinguishes between two modes of operation, viz., an Active mode and a Passive mode. All devices support both communication modes. I the active mode of communication, both devices, i.e., both the Initiator and the Target, generate their own RF field to carry the data. In the passive mode of communication, only one device (the Initiator) generates the RF field while the other device (the Target) uses load modulation to transfer the data. This can be an important consideration for battery-powered devices, since the conservation of battery power is generally a high priority. As such, the protocol enables a device, such as a mobile phone, to operate in a power-saving mode (passive mode of NFC communication). In other words, the passive mode does not require both devices to generate the RF field and enables a complete communication to be powered from one side only. (The device still needs to be powered internally, but does not have to "waste" the battery on powering the RF communication interface.)

The difficulty in using longer-range protocols, such as Bluetooth and Wireless Ethernet (Wi-Fi), is in selecting the correct device from a multitude of devices in the operating range and providing the right parameters to establish the connection. However, NFC overcomes this difficulty, as once the configuration data has been exchanged using NFC, the devices can then easily setup and continue to communicate over a greater range and using faster protocols, such as Bluetooth or Wireless Ethernet (Wi-Fi).

Figure 2:
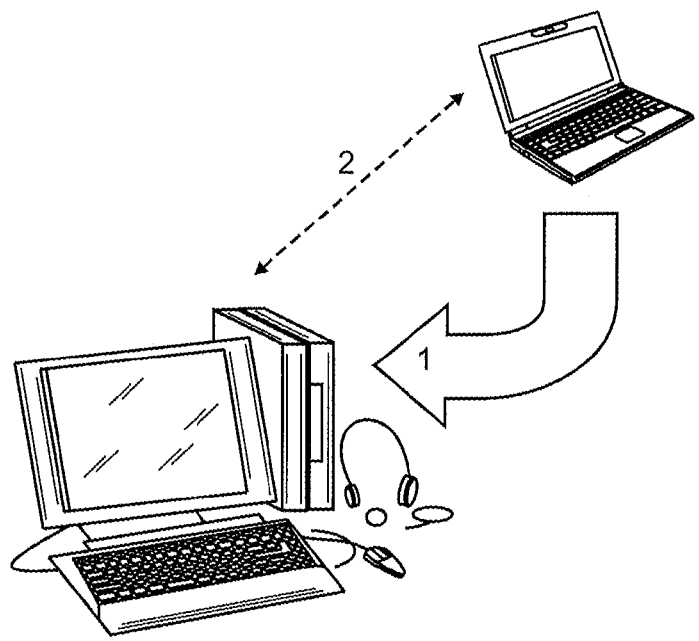
FIGS. 2 and 3 show the establishment of a Bluetooth or a similar short range wireless communication between two computers using NFC.
Figure 3:
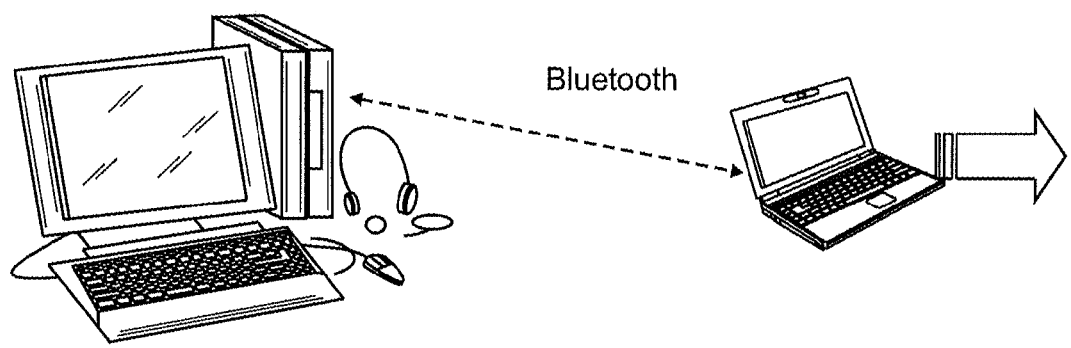

For example, as indicated by the dashed double-headed arrow 2 in FIG. 2, ordinarily, to establish Bluetooth communication between two computers, the two devices need to be set up manually with a password to protect communication. However, as indicated by the broad arrow 1 in FIG. 2, NFC may be used as a first step in establishing, e.g., a Bluetooth communication link by simply touching, or "tapping" one of the two devices against the other, or by bringing the two devices into close proximity to each other. By touching the devices at a "hotspot," they can automatically open a data connection link to exchange the parameters of the Bluetooth communication and thereby seamlessly establish a secret key without any further action being required on the part of the user. As illustrated in FIG. 3, once the Bluetooth communication link is established, the devices can then be moved away from each other in a second step as communication between the devices continues using the session of Bluetooth that was previously established.

Figure 4:
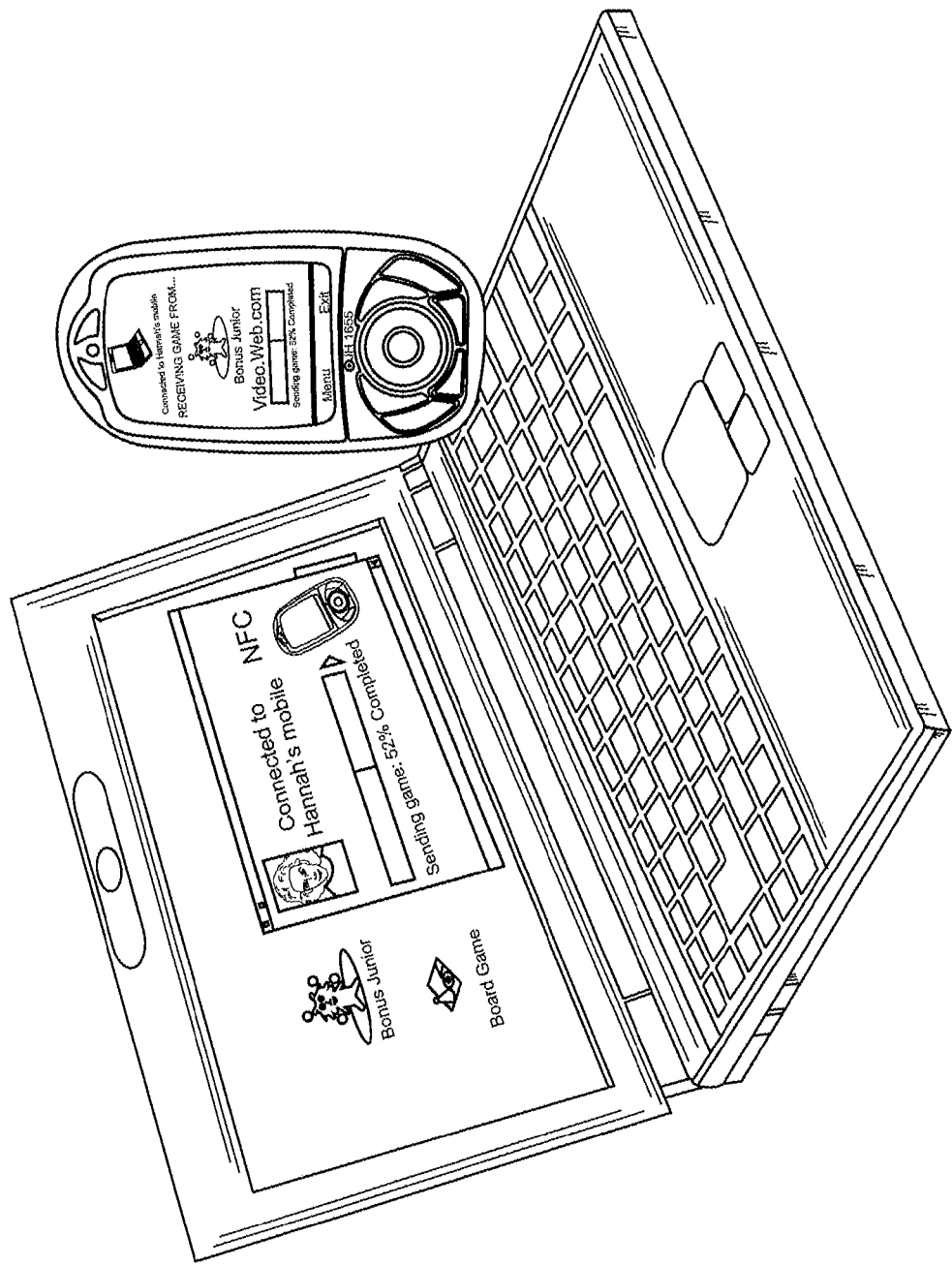
FIG. 4 shows the use of an NFC enabled computer (PC) and NFC enabled mobile phone to download a game application from a website directly into the mobile phone.

Substantially the same NFC procedure may be used to establish a wireless (e.g., Bluetooth, Wi-Fi, or the like) connection with a variety of devices, from mobile phones that enable payment or transfer of information to digital cameras that send their photos to a television set with just a touch. For example, as illustrated in FIG. 4, by using an NFC enabled computer (PC) and an NFC enabled mobile phone, a game application may be downloaded from a website directly into the mobile phone from the PC.

NFC capabilities further include information access via "smart poster" applications. In this example, the user taps an NFC enabled mobile phone to a tag embedded in a poster or similar object, which then triggers the transmission of a uniform resource locator (URL) to the phone. The URL could be used, for example, to direct a user to a website at which the user can gather information or download a special coupon or token.

Figure 5:
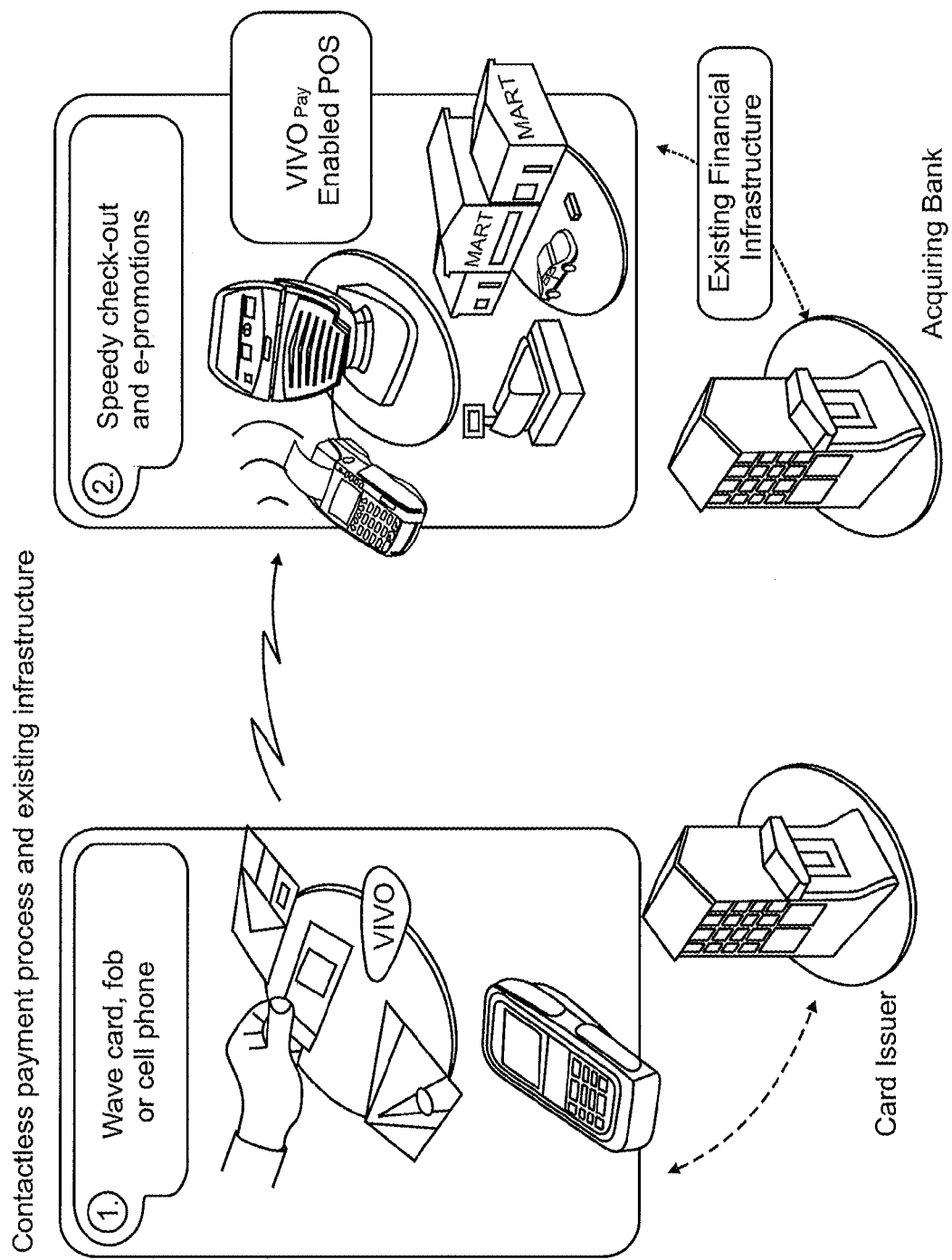
FIG. 5 shows an example of NFC devices communicating consumer account information via radio frequency (RF) to a retailer's payment terminal.

As illustrated in FIG. 5, other examples of NFC applications include mobile cell phones, cards, or key fobs that have a built-in integrated circuit (IC) microchip and antenna. The chip is able to emulate contactless smart cards. Consumers can use the NFC device to communicate consumer account information via radio frequency to the retailer's payment terminal, such as the VIVO pay line of contactless payment systems manufactured by VIVOtech. The payment terminal then connects to the appropriate financial networks or other back-end processing system to authorize the transaction. Once authorized, the consumer completes the transaction and receives payment confirmation.

Mobile cell phones or "wallet phones" may include a prepaid "wallet" that can be used for making mobile payments. Users interact with readers at point of sale (POS) terminals or cash machines to recharge the wallet and access control systems located there, for example, ticketing and reservation systems at train stations, airports, hotels, and the like, using the wallet phone to make purchases.

Figure 6:
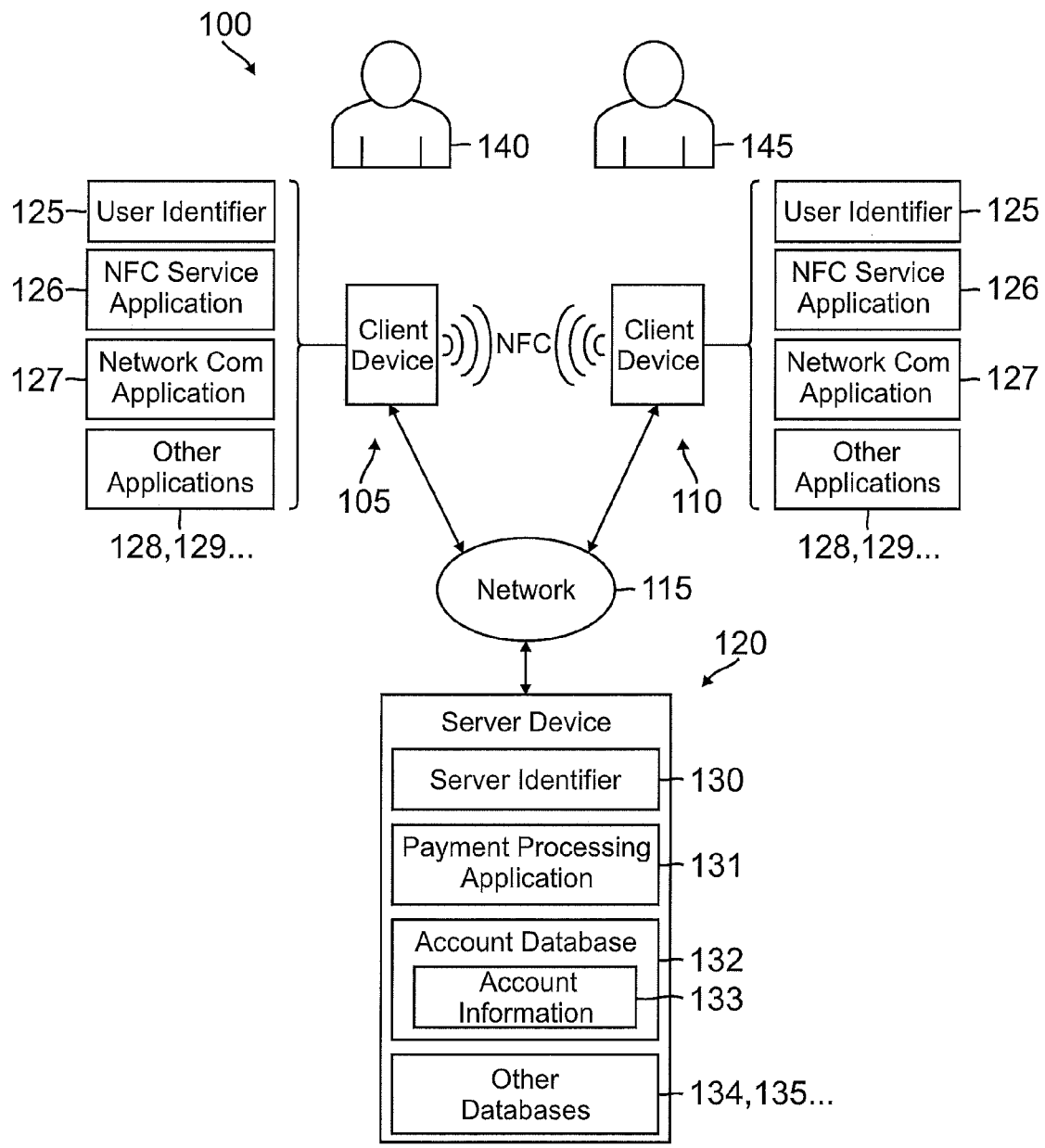
FIG. 6 shows a system and method for enabling a peer-to-peer financial transaction between mobile devices using near field communication in a network environment in accordance with one embodiment.

FIG. 6 illustrates an example embodiment of a system and method for enabling a peer-to-peer financial transaction between mobile devices using near field communication in a network environment in accordance with this invention. The system and method for enabling a peer-to-peer financial transaction between mobile devices 100 may include a first NFC enabled mobile device 105 and a second NFC enabled mobile device 110, a network 115 to enable connectivity between entities/elements and the flow of information, and a third party payment provider system 120 (PPS) for, among other things, payment processing (verification, authorization and confirmation) of the financial transaction between the mobile devices 105 and 110, as well as the debiting and crediting of appropriate accounts respectively associated with each of the users 140 and 145 thereof.

As used herein, the term "mobile device" is a broad term and may include, but is not limited to, cell phones, personal digital assistants (PDAs), smart phones, key fobs, smartcards, computers or PCs, or similar type of augmented objects or devices.

Each of the mobile devices 105 and 110 are NFC enabled and may include, among other things, a user identifier 125, an NFC service application 126, a network communication application 127, and other applications 128, including a payment provider application, a browser application, a toolbar application, and the like, as may be necessary to enable NFC communication between the mobile devices 105, 100 and the payment provider system 120 via the network 115.

Broadly, the NFC service application 126 provides those features that generally enable NFC communication between NFC enabled devices, but may also enable the user to activate various multimedia features, as well as to effect financial transactions via icon linked applications, such as "send money," "request money," "send contact information," "acquire contact information," and the like.

Likewise, the payment provider application provides those features that generally enable the mobile device 105 and 110 to communicate with the payment provider system 120, but may also enable the user to activate various multimedia features, as well as to effect financial transactions via icon linked applications, such as "send money," "request money," "send contact information," "acquire contact information," and the like.

Accordingly, persons of ordinary skill in the art will understand that the use of either a NFC service application and a separate payment provider application, or the use of a single bundled application that is the functional equivalent of the NFC service application and the payment provider application, in any mobile device may depend on a number of factors, including manufacturer preferences, cost, and intended use, to name a few. Accordingly, the term "application," "applications," or "application(s)" as used herein indicates that either a separate NFC service application and a payment provider application, or a bundled application having capabilities of both the NFC service application and the payment provider application is present in the mobile device.

In one example embodiment, the network 115 may be implemented as a single network or a combination of multiple networks. For example, in various embodiments, the network may include the Internet and/one or more intranets, landline networks, wireless networks, and/or other appropriate types of communication networks. In another example, the network may comprise a wireless telecommunications network (e.g., cellular phone network) adapted to communicate with other communication networks, such as the Internet.

The payment provider system 120 may include, among other things, a server identifier 130, a payment processing application 131, and an account database 132 having account information 133 and other databases 134, as may be required to enable payment processing between the mobile devices 105 and 110.

In one embodiment, a financial transaction between the mobile devices 105 and 110 may include the transfer or sending of money from the first mobile device 105 (sender) to the second mobile device 110 (recipient). In this regard, preconditions for the successful completion of the transfer of money between mobile devices 105 and 110 include the assumptions that the first mobile device 105 and the second mobile device 110 are NFC enabled; that a payment provider service application 126, NFC service application, or bundled application is present on the sender's 140 mobile device 105; and, that at least the sender 140 has a previously established payment provider account 132.

In this regard, the application(s) setup may be facilitated over-the-air (OTA), wherein, depending on implementation, an OTA application/software download can be initiated upon an action, such as a call to the payment provider system 120 or other dialable service, or can be performed automatically when visiting a service site.

Alternatively, the application(s) setup may be facilitated by using another NFC chip, wherein, for example, a preloaded NFC card issued by the payment provider system 120 or other entity may be pre-loaded with a basic application, account information, URL, and the like, such that, when touched to an NFC enabled mobile device, the information is transferred to the mobile device to permit access to an OTA site where the application/software download can be effected.

Figure 7:
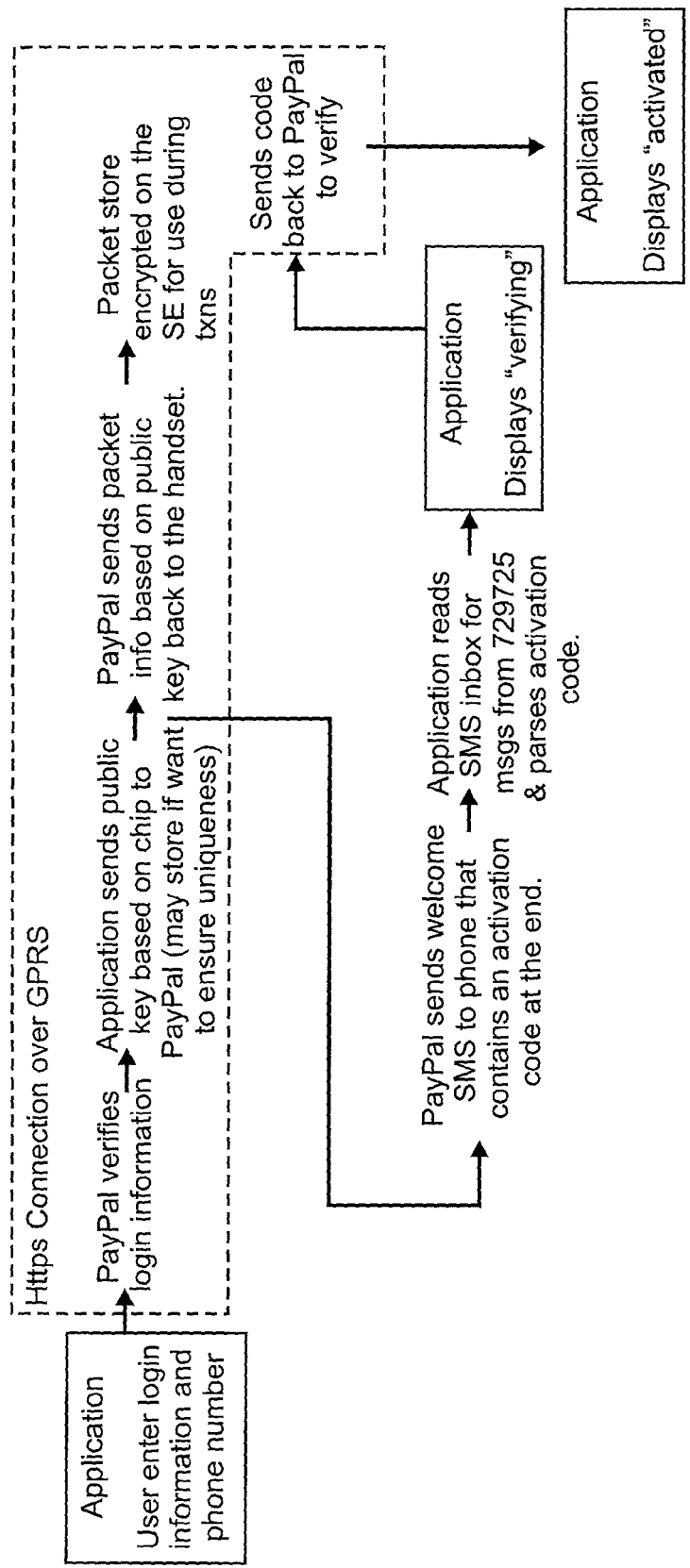
FIG. 7 shows application(s) activation in accordance with one embodiment.

In one embodiment, an initial payment provider application activation process may be required to be completed prior to utilizing the application(s) 126-129 for the first time. In this regard, as illustrated in FIG. 7, application(s) activation may begin with the user entering login information, such as a phone number, pin number, email address and/or password, and the like, in the mobile device 105, 110. The application forwards the information and a public key (unique identifier) 125 based on the NFC mobile device's chip to the payment provider system 120. In one embodiment, network connectivity for the communication of voice and/data between the mobile device 105, 110 and the payment provider, e.g., PayPal. A Short Message Service (SMS) text message to the mobile device is then communicated from the payment provider system 120 may be facilitated by an HTTPS (Hyper Text Transfer Protocol Secure) connection over a general packet radio service (GPRS). GPRS is a packet based wireless communication service that offers continuous connection to the Internet or other network 115 for mobile phone and computer users. GPRS is based on GSM (Global System for Mobile Communication) and complements existing services such as circuit switched cellular phone connections and the Short Message Service (SMS), i.e., text message. Persons of skill in the art will understand similar protocols and wireless services may be utilized within the scope of the disclosure to enable wireless connectivity and communication between the mobile devices and the payment service provider.

In response to receiving the user's information and unique identifier, the service provider system 120 sends packet information to the mobile device 105, 110. The packet information from the payment provider system 120 to the mobile device may include data relating to country, currency, language, activation code and/or security keys. A corresponding code generated by the application is then communicated back to the payment provider system 120 from the mobile device 105, 110.

In this regard, such a back-and-forth communication or "handshake" between the mobile device 105, 110 and the payment provider system 120 allows for user and/or system verification, authorization, and compatibility check to complete the application(s) activation process. Typically, the users 140, 145 are then notified that the application is activated. Packet information previously sent from the payment provider system 120 to the mobile device 105, 110 is stored on the chipset for future use when activating the application(s) 126-129. The payment provider system 120 may further communicate a short welcome text message to the mobile device 105, 110.

After the initial setup and activation of the application(s) is complete, subsequent activation of one or more of the application(s) may occur upon activation of the mobile device. In one embodiment, the mobile device 105 may be a cell phone in which activation may occur upon opening the mobile device 105. Typically, as indicated above, access or activation of the mobile device 105 will likewise activate one or more of the applications. In another case, the sender 140 may be required to touch a feature (e.g., an icon, pushbutton, or the like) on the mobile device 105 to access and activate one or more of the application(s). In yet another case, activation of one or more of the applications may occur upon "tapping" or bringing the mobile device 105 in close proximity with another NFC enabled device.

Upon activation of the mobile device 105, the sender 140 may be presented with menu options for enabling various functions, including those associated with, for example, multimedia features (e.g., music, video, games, and the like), user contact information, and those relating to financial transactions, such as "request money," "send money," and the like.

The sender 140 may then choose the desired function from the menu options, for example, "send money" in the case of a proposed money transfer between the mobile devices 105 and 110. In one embodiment, the sender 140 may be asked to enter, in no particular order, funding particulars, including a funding source (e.g., MC, VISA, AMEX, Citibank, PPS account, or other funding source account), the amount of money to be sent, and login information (PIN, pass code, password, or the like).

As persons of ordinary skill in the art will appreciate, in the absence of an affirmative choice of one or more presented funding particulars, preset default settings may be enabled. In addition, in some embodiments, the sender 140 may be presented with the opportunity to review and edit the payment choices prior to communicating the payment request to the payment provider system 120.

Upon activation of the mobile device 110, the recipient 145 may, like the sender 140, be presented with various menu options for enabling various functions, including those associated with multimedia features (e.g., music, video, games, and the like), user contact information, and those relating to financial transactions, such as "request money," "send money," and the like.

The recipient 140 of the intended money transfer may then choose the desired function from, for example, "receive money" or "ready, wait" a default setting having implications of what is being shared) in the case of the above described proposed money transfer between the mobile devices 105 and 110. In one embodiment, by choosing the "receive money" function, the recipient implicitly/explicitly agrees to provide certain designated information, such as email address, phone number, receiving account information, and the like, to facilitate funding by the payment provider system 120 to the designated recipient account, digital wallet (phone), or email address where funds may be deposited or acquired.

The sender 140 may then simply touch or "tap" the NFC enabled mobile device 110 of the recipient 145 with the sender's mobile device 105 to effect the transfer of the designated recipient information from the recipient's mobile device 110 to the sender's mobile device 105 via NFC.

As persons of ordinary skill in the art will understand, although the method(s)/step(s) are illustrated and described herein as occurring in a certain order, the specific order, or any combination or interpretation of the order, is not required. Obvious modifications will be apparent to those of ordinary skill in the art, all of which will not depart from the essence of disclosed subject matter, and all such changes and modifications are intended to be encompassed within the scope of the disclosure.

For example, recipient information may be acquired prior to selecting the funding source and/or the amount of money to be sent by the sender 140. In this regard, the acquisition of recipient information may automatically activate the "send money" function on the sender's mobile device 105, thereby presenting the menu options for enabling various functions, including those relating to financial transactions, as described above.

The sender's payment request is then automatically communicated (submitted) to the payment provider system 120 for processing, including, among others, verification, authorization, distribution, and confirmation thereof. Alternatively, the sender 140 may be provided with an opportunity to review the payment request information prior to its submission to the payment provider system 120.

Upon the successful completion of payment processing, the payment provider system may communicate a corresponding SMS notification, i.e., successful transfer of funds, successful deposit of funds, amount of transfer or deposit, or some other related message informing the sender 140 and/or the recipient 145 of the payment processing results, such as by way of an email, phone call, or a multimedia messaging service (MMS) message. Sender 140 and/or recipient 145 notifications may further include an audible and/or a visible and/or a tactile indication, such as a vibration in the respective device.

In summary, in one embodiment, contact information of the transfer is communicated directly via NFC from the recipient's mobile device 110 to the sender's mobile device 105. Payment review is done via NFC from the sender's mobile device 105 to the recipient's mobile device 110 showing the conditions of the financial transaction. The payment request is communicated OTA to the payment provider system 120 in real-time, while notifications and confirmations are communicated to the sender's mobile device 105 and the recipient's mobile device 110 via SMS and/or MMS and/or other form of sensible indicator.

As described above, peer-to-peer payment between mobile devices 105 and 110 may be facilitated using near field communication in a network environment. In this regard, objects such as mobile devices 105 and 110 may be augmented with a chip to permit users to gather information and/or conduct financial transactions. Such transactions include the payment for goods, receiving money, transferring money, and transferring and receiving user information.

With reference to FIG. 6, in one embodiment, a financial transaction may comprise a two step or "two-tap" process between NFC enabled mobile devices 105 and 110 in which a first "tap" between the devices communicates contact information (e.g., cell phone number or email address), and a second "tap" between the devices communicates the payment request to the payment provider system 120. As discussed above, the sender 140 may be given the opportunity to review and edit certain of the details of the transaction, e.g., payment amount, funding account, and the like, after effecting the first tap and before effecting the second tap.

In the two-tap embodiment, a money transfer or financial transaction between the respective NFC enabled devices 105 and 110 of a sender 140 and a recipient 145 is facilitated by a third party service provider 120, such as PayPal, and comprises: 1) the sender 140 entering a payment request (e.g. amount, funding instrument, and the like) into his or her NFC device 140, 2) the sender then gathering recipient information via a first tap between the respective NFC devices, 3) the sender then sending the request to the third party provider 120, which is effected by a second tap between the two devices, and 4) the service provider 120 sending confirmation of the transaction to the sender and recipient. The two NFC devices 105 and 110 may connect, for example, to the Internet to effect the money transaction, and additional information can be transferred along with payment, such as user ID, avatars, icons, and the like. Once the transaction is in progress or completed, the users may be notified, such as by means of an audio and/or visual indication and/or a vibration of the respective NFC devices.

In an alternative embodiment, as shown in FIG. 6C, after entry of the payment request into the recipient's device 145, contact information gathering and payment request communication with a service provider, as described above, may both be effected with a single tap between the NFC enabled mobile devices 105 and 110.

The systems and methods for payment between mobile devices 105 and 110 using near field communication in a network environment may be utilized to facilitate an "open loop" financial transaction in which a one time virtual credit card or debit account is issued by the payment provider system 120 and used by a merchant so that the user and merchant view the process as a standard financial transaction.

Alternatively, the systems and methods for payment between mobile devices 105 and 110 using near field communication in a network environment may be utilized to facilitate a "closed loop" financial transaction in which the payment provider system 120 provides POS terminals for merchants. In this regard, a user can "tap" his or her mobile device 105 on the POS terminal to pay for merchandise and the merchant is paid directly through the payment provider system 120.

Figure 8A:
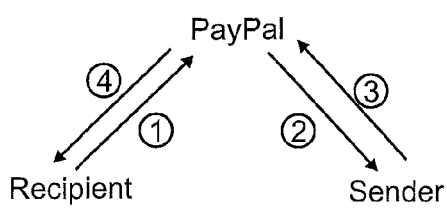
FIGS. 8A and 8B respectively illustrate a typical "known" request for money and a contrasting request for money in a peer-to-peer financial transaction between mobile devices using near field communication in a network environment in accordance with one embodiment of the present invention.
Figure 8B:
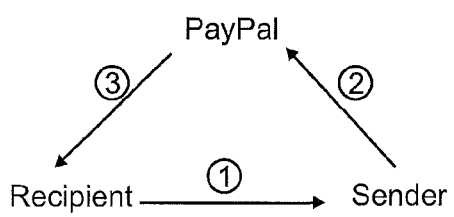

FIGS. 8A and 8B respectively illustrate a typical "known" type of request for money and a contrasting request for money in a peer-to-peer financial transaction between mobile devices using near field communication in a network environment in accordance with one embodiment of the present invention.

In contrast to the known four-step process for requesting money illustrated in FIG. 8A, a money request utilizing NFC may, as illustrated in FIG. 8B, include a first step of (1) the recipient sending a request for money to the sender via NFC, a second step of (2) the sender authorizing payment with the payment provider system via OTA, and a third step of (3) the payment provider system notifying the recipient of the transfer of funds.

In this regard, by communicating information via NFC, the sender only needs to enter a PIN to approve payment with the payment provider system.

Similar to the money request disclosed in FIG. 8B, a "charge for a service" may be conducted in a peer-to-peer financial transaction between mobile devices using near field communication in a network environment in accordance with one embodiment. In this regard, in the first step of FIG. 8 data content, for example a music download, may be communicated to the sender's mobile device along with a money request for the music download from the recipient's mobile device via NFC. If the sender agrees to the purchase or sending of money for the music download the process would continue as disclosed in step (2) and step (3) above.

Figure 9:
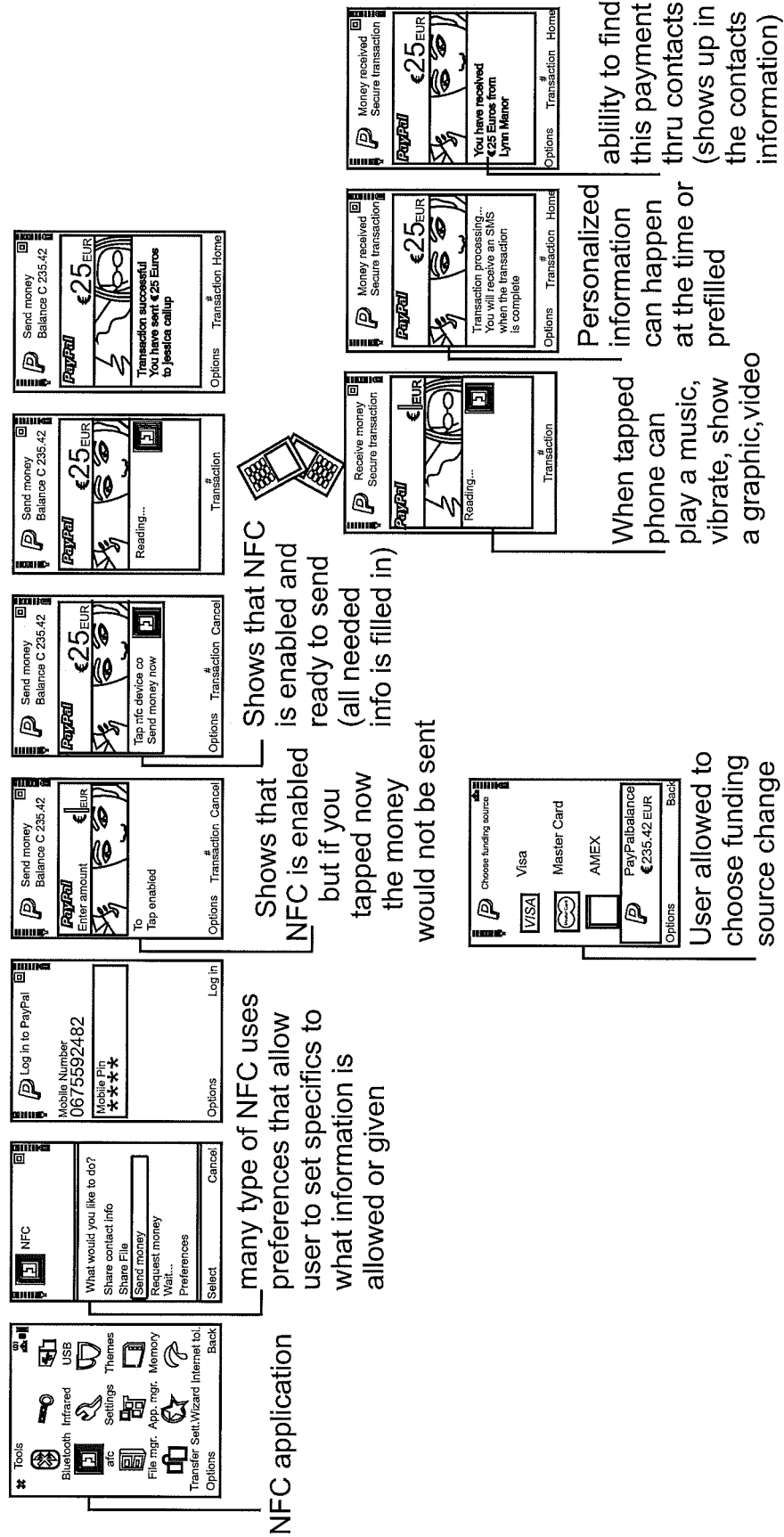
FIG. 9 shows examples of various interface screens that be applicable to the a sender's mobile device and/or a recipient's mobile device for conducting a peer-to-peer financial transaction between mobile devices using near field communication in a network environment in accordance with one embodiment.

FIG. 9 shows examples of various interface screens that can be displayed on a sender's and/or a recipient's mobile device for conducting a peer-to-peer financial transaction between two mobile devices using near field communication in a network environment in accordance with one embodiment of the present disclosure.

Although the apparatus and methods of the present invention have been described and illustrated herein with reference to certain specific example embodiments thereof, it should be understood that a wide variety of modifications and variations may be made to these without departing from the spirit and scope of the invention, as defined by the claims appended hereafter and their functional equivalents.

What is claimed is:

1. A method, comprising:
    receiving information relating to a transfer by a near field communication (NFC) enabled data communication device of a sender;
    detecting the device of the sender is within a first proximity to an NFC enabled data communication device of a recipient a first time;
    in response to the detecting:
        establishing a first NFC link between the device of the sender and the device of the recipient; and
        transmitting information relating to the recipient from the device of the recipient to the device of the sender via the first NFC link;
    detecting the device of the sender is within the first proximity to the device of the recipient a second time; and
    in response to detecting the device of the sender is within the first proximity of the device of the recipient the second time:
        establishing a second NFC link between the device of the sender and the device of the recipient;
    in response to establishing the second NFC link, establishing a data communication link between the device of the sender and a third party service provider via a network; and
    transmitting the information relating to the transfer and the information relating to the recipient directly from the device of the sender to the third party service provider via the network and thereby cause the service provider to transfer money from a funding account of the sender to a receiving account of the recipient.

2. The method of claim 1, further comprising receiving changes to the information relating to the transfer after detecting the device of the sender is within the first proximity to the device of the recipient the first time and before detecting the device of the sender is within the first proximity to the device of the recipient the second time.

3. The method of claim 1, wherein at least one of the NFC enabled devices of the sender and the recipient comprises a cell phone, a personal digital assistant (PDA), a smart phone, a fob, a smartcard, a computer, a personal computer (PC) or a point of purchase (POP) terminal.

4. The method of claim 1, wherein detecting the device of the sender within the first proximity to the device of the recipient the first time and the second time comprises detecting the device of the recipient being tapped with the device of the sender.

5. The method of claim 1, wherein the information relating to the transfer comprises at least one of the group consisting of the sender's identity, funding account and amount of the transfer.

6. The method of claim 1, wherein the information relating to the recipient comprises at least one of the group consisting of the recipient's identity, cell phone number, email address and receiving account.

7. The method of claim 1, wherein the network comprises the Internet, an intranet, a landline network or a wireless network.

8. The method of claim 1, further comprising transferring other information to the service provider along with the information relating to the transfer and the information relating to the recipient, the other information comprising one or more of the group consisting of the user's identity, password, pin number, avatars and icons.

9. The method of claim 1, further comprising receiving a message confirming the transfer of the money from the sender to the recipient.

10. The method of claim 9, wherein the message comprises at least one of the group consisting of a visible message, an audible message and a tactile message.

11. The method of claim 1, wherein each of the device of the sender and the device of the recipient comprises software adapted to facilitate at least one of:
    establishing the first NFC link and the second NFC link between the device of the sender and the device of the recipient; and
    effecting the transfer of the money from the sender to the recipient.

12. The method of claim 1, further comprising:
    encrypting communications between the device of the sender and the device of the recipient via the first NFC link and the second NFC link; and
    encrypting communications between the device of the sender and the service provider via the network.

13. A system, comprising:
a sender's near field communication (NFC) enabled data communication device adapted to receive information relating to a transfer entered by the sender; and
a recipient's NFC enabled data communication device adapted to transmit information relating to the recipient to the sender's device via a first NFC link established between the two devices,
wherein the sender's device is operable in response to detecting the recipient's device within a first proximity a first time to:
establish the first NFC link between the sender's device and the recipient's device; and
gather the information relating to the recipient from the recipient's device via the first NFC link; and
wherein the sender's device is operable in response to detecting the recipient's device within the first proximity a second time to:
establish a second NFC link between the sender's device and the recipient's device; and
in response to establishing the second NFC link, transmit the information relating to the transfer and the information relating to the recipient to a third party service provider via a network and thereby cause the service provider to transfer money from a funding account of the sender to a receiving account of the recipient.

14. The system of claim 13, wherein at least one of the sender's and the recipient's NFC enabled devices comprises a cell phone, a personal digital assistant (PDA), a smart phone, a fob, a smartcard, a computer, a personal computer (PC) or a point of purchase (POP) terminal.

15. The system of claim 13, further comprising a service provider server device operable to receive the information relating to the transfer and information relating to the recipient from the sender's device via the network and to verify, authorize and confirm the transfer of the money from the sender to the recipient.

16. The system of claim 15, wherein the service provider server device is further operable to effect the transfer of the money from the funding account of the sender to the receiving account of the recipient.

17. A non-transitory machine-readable medium having stored thereon machine-readable instructions executable to cause a machine to perform operations comprising:
provisioning a near field communication (NFC) enabled data communication device of a recipient of money with information relating to the recipient, the information including a designated acquiring account of the recipient;
establishing a first NFC link between the device of the recipient and an NFC enabled data communication device of a sender of the money;
transmitting the information relating to the recipient from the device of the recipient to the device of the sender via the first NFC link;
establishing a second NFC link between the device of the recipient and the device of the sender; and
receiving the money in the designated acquiring account of the recipient,
wherein establishing the first NFC link and transmitting the information relating to the recipient comprise detecting the device of the recipient and the device of the sender within a first proximity to each other a first time, and
wherein establishing the second NFC link and receiving the money in the designated acquiring account of the recipient comprise detecting the device of the recipient and the device of the sender within the first proximity to each other a second time.

18. The non-transitory machine-readable medium of claim 17, wherein detecting the device of the recipient and the device of the sender within the first proximity to each other the first time and the second time comprises detecting the device of the sender and the device of the recipient being within a range of from about 0 to about 10 centimeters from each other.

19. The non-transitory machine-readable medium of claim 17, wherein detecting the device of the recipient and the device of the sender within the first proximity to each other the first time and the second time comprises detecting the device of the recipient touching the device of the sender.

20. A non-transitory machine-readable medium having stored thereon machine-readable instructions executable to cause a machine to perform operations comprising:
receiving, at a service provider, information relating to a transfer of money to a recipient from a sender and information relating to the recipient via a network; and
transferring the money from a funding account of the sender to a receiving account of the recipient in response to receiving the information relating to the transfer and the information relating to the recipient by the service provider,
wherein the information relating to the recipient is transmitted from the recipient to the service provider at least in part via a first near field communication (NFC) link and is effected by detecting respective NFC enabled data communication devices of the sender and the recipient within the first proximity to each other a first time to establish the first NFC link, and
wherein transferring the money is in response to establishing a second NFC link and is effected by detecting the respective data communication devices of the sender and the recipient within the first proximity to each other a second time to establish the second NFC link.

21. The non-transitory machine-readable medium of claim 20, further comprising sending a message confirming the transfer of the money to at least one of the sender and the recipient.

22. The non-transitory machine-readable medium of claim 21, wherein the message comprises at least one of the group consisting of a visible message, an audible message and a tactile message.

* * * * *